US00RE38356E

(19) United States
(12) Reissued Patent
Weirauch et al.

(10) Patent Number: US RE38,356 E
(45) Date of Reissued Patent: Dec. 23, 2003

(54) SPLICING METHOD AND SPLICE USING THE SPLICING TAPE

(75) Inventors: Hans Julius Weirauch, Neuss (DE); Max Holderbusch, Neuss (DE)

(73) Assignee: 3M Innovative Properties Company, St. Paul, MN (US)

(21) Appl. No.: 09/921,732

(22) PCT Filed: Oct. 27, 1994

(86) PCT No.: PCT/EP94/03528

§ 371 (c)(1),
(2), (4) Date: Oct. 25, 1996

(87) PCT Pub. No.: WO95/29115

PCT Pub. Date: Nov. 2, 1995

Related U.S. Patent Documents

Reissue of:
(64) Patent No.: 5,996,927
Issued: Dec. 7, 1999
Appl. No.: 08/732,241
Filed: Oct. 25, 1996

(30) Foreign Application Priority Data

Apr. 26, 1994 (EP) ..... 9401407

(51) Int. Cl.[7] ..... B65H 19/18
(52) U.S. Cl. ..... 242/556.1; 156/504
(58) Field of Search ..... 242/556, 556.1; 156/502, 504, 507

(56) References Cited

U.S. PATENT DOCUMENTS

| | | | | | |
|---|---|---|---|---|---|
| 2,149,832 | A | * | 3/1939 | Bernard | 242/556.1 |
| 2,149,833 | A | * | 3/1939 | Bernard | 242/556.1 |
| 2,172,776 | A | * | 9/1939 | Scott | 242/556 |
| 2,377,971 | A | * | 6/1945 | Roesen | 242/556.1 |
| 2,920,835 | A | * | 1/1960 | Gibson | 242/556.1 |
| 3,547,739 | A | * | 12/1970 | Beute | 242/556.1 |
| 4,564,150 | A | * | 1/1986 | Keene et al. | 242/556.1 |
| 4,575,017 | A | * | 3/1986 | Pali | 242/556.1 |

(List continued on next page.)

FOREIGN PATENT DOCUMENTS

| | | | |
|---|---|---|---|
| CA | 2025473 | * | 3/1991 |
| DE | 31 23 414 | * | 4/1982 |
| EP | 555 772 | * | 8/1993 |
| WO | WO 90/08032 | * | 7/1990 |
| WO | WO 94/25381 | * | 11/1994 |

*Primary Examiner*—William A. Rivera
(74) *Attorney, Agent, or Firm*—James J. Trussel; Colene H. Blank

(57) ABSTRACT

A splicing tape (200) comprises a splicing portion (1,2) and an attachment portion (42,48), said attachment portion (42, 48) being provided for releasably and self-supportively attaching said splicing tape (200) substantially across the width of a roll of sheet material. A first adhesive layer (2) is provided on a backing (1) extending from one longitudinal edge of the backing (1) across the tape to a first position towards the center of the backing (1), said first adhesive layer (2) being provided for attaching the leading edge of the roll to the splicing tape (200). A second adhesive layer (2) is provided on the backing (1) beginning at or beyond, but not overlapping the first position and extending towards the second longitudinal edge of the backing (1). The second adhesive layer is for attachment to a further sheet material. The attachment portion (42,48) includes a third adhesive layer adapted to release the leading edge and splicing portion (1,2) from the underlying sheet material leaving a non-tacky outer surface of the underlying sheet material. The splice can be completed by attaching a further sheet material to the splicing portion (1,2). The third adhesive layer may be provided by a weakly adhering or stretch release adhesive layer. The invention may be adapted to produce overlap, in particular staggered overlap splices.

According to the invention, methods of making permanent or flying splices are provided.

21 Claims, 12 Drawing Sheets

U.S. PATENT DOCUMENTS 4,905,924 A * 3/1990 Moore ..... 242/556.1
5,212,002 A * 5/1993 Madrzak et al. ..... 242/556.1
5,275,344 A * 1/1994 Ray ..... 242/556.1
5,277,731 A * 1/1994 Krimsky et al. ..... 156/504
5,301,891 A * 4/1994 Duguay ..... 242/556
5,318,656 A * 6/1994 Dylla et al. ..... 156/504
5,323,981 A * 6/1994 Dionne ..... 242/556.1
5,348,793 A * 9/1994 Stettner ..... 242/556.1
5,356,496 A * 10/1994 Lincoln et al. ..... 156/504
5,397,076 A * 3/1995 Padilla ..... 242/556.1
5,692,699 A * 12/1997 Weirauch et al. ..... 242/556.1

* cited by examiner (Pror Art)

SPLICING METHOD AND SPLICE USING THE SPLICING TAPE

Matter enclosed in heavy brackets [ ] appears in the original patent but forms no part of this reissue specification; matter printed in italics indicates the additions made by reissue.

BACKGROUND OF THE INVENTION

The present invention relates to permanent or flying splices between sheet materials of the butt, overlap and in particular staggered overlap kind, a splicing tape for use in producing such splices and methods of using the splicing tape in producing butt, and overlap, particularly staggered overlap splices.

In this application and merely for clarity purposes, the leading end and edge of sheet material on a roll is considered to be the last quadrant of sheet material exposed on the outside of the roll, i.e. the section 32 of sheet material shown in FIG. 3B from the imaginary line A–A' to the edge 35. The underlying winding of such a roll is then the piece of sheet material on which the leading edge 35 rests, from A–A' through 360° A–A' again.

Two common types of splice are known for webs of sheet materials. Firstly, there is a permanent splice for joining the leading edge of one roll or part roll to the trailing edge of a further roll or part roll. The permanent splice should provide a flexible strong connection between the two webs and should maintain substantially all of the properties of the sheet material, for example if the sheet material is paper which can be printed or coated, the permanent splice is preferably, thin, flexible, printable, coatable and should also have the same repulpable properties as paper. Conventional splicing tapes and splices do not generally meet all of these requirements. Further, when joining part rolls the second roll is normally wound back onto the first roll in order to produce a complete roll and the permanent splice is then located somewhere in the middle of the new larger roll. This splice is subject to high pressures caused by the winding tension and it is important that no adhesive materials are present either on or near the splice or bleed out of the splice during storage which could adhere layers of sheet material together or damage or obstruct printing machinery.

A typical permanent butt splice is shown in FIG. 1A. Such a splice can be manufactured using a splice tape as shown in FIG. 13 and described in WO 90/08032.

A permanent overlap splice is also known as is shown in FIG. 1B and is known in a modified form from WO 93/12025. Here the leading and trailing edges 3 and 4 of the first and second rolls are joined together by a double sided tape of the kind shown in FIG. 14. With reference to FIG. 3B the last sheet layer 32 of the roll 30 is secured by small adhesive tabs 33 applied on both sides of the roll 30. One of the release foils 10 (or 11) is then removed from the double sided tape 24 to expose the pressure sensitive adhesive 2A (or 2B) and the tape is applied across the width of the last sheet layer 32 of the roll. The excess of the leading edge is folded back against the double sided tape and is creased and torn off so that the final leading edge 35 abuts the double sided adhesive tape 24 as shown in FIG. 3B. In this condition the roll may be stored until a splice must be made. In order to complete the splice the remaining release foil 11 (or 10) is removed thus exposing the pressure sensitive adhesive 2B (or 2A) and the trailing edge of the second roll is then applied to the exposed pressure sensitive adhesive. The excess of the trailing edge is folded back to the adhesive join and is creased and torn off in the same way as described above with respect to the leading edge of the first roll. The splice now appears as in FIG. 1B.

This type of splice has a disadvantage that there is a considerable step at the change from the sheet material 3 or 4 and the splice itself when compared with the butt splice shown in FIG. 1A. This step can disrupt the printing process. Further, there is the possibility of the adhesive bleeding out of the splice or bleeding through the paper if placed under pressure. Additionally, the webs of sheet material may move relative to each other when tension in the web puts the splice in shear. If movement occurs during multiple pass printing the alignment in successive printing stages is disturbed resulting in inferior quality. Any relative movement is likely to release adhesive with the serious consequences mentioned above. To prevent this movement an additional adhesive tape 6' is sometimes applied along the edge of the splice as shown in FIG. 1B. This improves the strength of the splice but increases its thickness still further.

Since a paper manufacturer is often held liable by the printer for damage caused by the splice it is desirable to provide a reliable splicing method and splice which does not affect the printing process. In particular a sheet surface with exposed aggressively tacky adhesive is considered not to be machine printable.

In order to reduce the step at the splice, a staggered overlap splice as shown in FIG. 1C has been proposed in EP-0555772 which can also be produced with a splicing tape shown in FIG. 15. The splice in accordance with FIG. 1C may still suffer from the bleeding out problems of the overlap splice shown in FIG. 1B and has the further disadvantage that the leading edge of the first roll must be cut to a straight line before application of the tape rather than being able to tear off the leading against the adhesive join.

Splicing can also become necessary when insufficient sheet material is left on one drum. Webs from two drums must be attached together.

Flying splices are usually temporary splices made at machine running speeds between rolls when it is undesirable to stop the machine, e.g. during coating or printing. The surface speed of the roll can be 1000 or even 2000 meters per second. Conventional way of making a flying splice can be understood from FIG. 3A with reference to U.S. Pat. No. 4,564,150 or CA-2025473. Double sided adhesive tape 24 similar to that shown in FIG. 14 is applied to the last layer 32 of a roll 30 of sheet material in the form of a W, a V or any other suitable arrangement. The last layer 32 of sheet material is torn off against the adhesive tape 24 leaving small wings 23 which are secured by small pieces of adhesive tape to the underlying winding 31 of sheet material. The adhesive tabs and the small wings 23 are important to hold down the noses of the last layer 32 of the sheet material when the roll is travelling at machine rotation speeds. It is important that air cannot enter beneath the leading edge 35 of the last sheet layer 32 which would result in the roll unwinding itself at very high speeds which could cause damage to the equipment and danger to the operators. In order to prevent air entering beneath the leading edge 35 of the last sheet layer 32, small adhesive tabs are sometimes applied not only at the noses of the leading edge but also along the diagonal edges of the leading edge 35. Completion of the splice is described in U.S. Pat. No. 4,564,150.

The final splice appears as in FIG. 2B. The leading edge 3 of the new roll is attached to the trailing edge 4 of the old roll by means of the double sided tape 1, 2A, 2B and the excess of the trailing edge left after cutting is indicated by 8.

It is possible to make a flying butt splice with a butt splicing tape of the kind shown in FIG. 13. The final splice is shown in FIG. 2A in which the leading edge of the new roll has been attached to the splicing tape via the pressure sensitive adhesive 2B and the trailing edge of the old roll has been attached to a large area of pressure sensitive adhesive 2A leaving the excess of the trailing edge 8 to trail behind.

Although the low step profile of the butt splice would be preferred for both permanent and the flying splices, several disadvantages with the application of the tape have resulted in this tape not being widely used for either permanent or flying splices. Firstly, a tape of the kind shown in FIG. 13 must be stretched across the width of a roll which may be 4 to 10 meters wide with the non-adhesive side of the backing 1 adjacent to the roll. This is usually done by two or more operators who provisionally may tape the roll into its final position using small pieces of adhesive tape. Such a procedure is time consuming and there is the danger that the small pieces of tape are not removed after application of the tape. Secondly, adhesive may be transferred from the tabs to the sheet material which can result in subsequent bonding between layers of the sheet material or fouling of printing machinery. Thirdly, flying butt splices have not found favour because it is necessary to lift the leading edge of the new roll in order to apply such tapes. This lifting of the leading edge allows air to enter between the leading end 32 of the new roll and the underlying winding 31 of the roll and thus there is an increased danger of the leading edge lifting off from the roll when it has reached machine speeds. The same problem of lifting the leading edge may also occur if a staggered overlap flying splice were to be made with the splicing tape shown in FIG. 15.

In DE-A-4033900, a modified flying butt splicing tape is proposed. This splice tape, therefore, leaves an exposed surface of adhesive on the underlying winding of the first roll at a distance of approximately one circumference of this roll from the actual splice. This exposed adhesive layer is capable of picking up sheet remnants or attaching itself to other objects or parts of the machinery which can disrupt smooth operation, in particular machine printing. Further, some of the materials used to make the splice could be environmentally improved. A further disadvantage is that after positioning on the roll the splicing tape is not repositionable.

None of the above mentioned conventional splicing tapes provide a low profile tape with the facility to releasably attach the tape to the underlying winding while leaving the undelying winding non-tacky when the splice is complete.

SUMMARY OF THE INVENTION

The present invention provides a splicing tape for splicing the leading edge of a roll of sheet material to a further sheet material, each winding of said sheet material on said roll having an outer surface facing radially outwards away from said roll; comprising:

a splicing portion and a pre-formed attachment portion, said splicing portion including:

an elongate backing member having two faces and two longitudinal edges;

a first adhesive layer on said backing member for attachment of the leading edge of the roll substantially across the width of said roll to said backing member, said first adhesive layer extending across the width of said backing member from substantially the first longitudinal edge of said backing member to a first position towards the centre thereof; and a second adhesive layer on a first face of said backing member for attachment of said backing member to said further sheet material, said second adhesive layer beginning at or beyond, but not overlapping with said first position and extending across the width of said backing member to a second position towards the second longitudinal edge of said backing member;

wherein said pre-formed attachment portion is connected to and distributed along said splicing portion for releasable and self-supportive attachment of said splicing tape to the outer surface of the underlying winding of said roll substantially across the width of said roll, said attachment portion including a third adhesive layer on said backing member for releasing at least said splicing portion from said underlying winding of said roll while leaving the outer surface of said underlying winding in a non-tacky condition.

Further the invention provides a splice on the leading edge of a roll of sheet material for attachment to a further sheet material, each winding of said sheet material on said roll having an outer surface facing radially outwards from said roll, comprising:

a splicing portion and a pre-formed attachment portion, said splicing portion comprising:

an elongate backing member having two faces and two longitudinal edges;

a first adhesive layer on said backing member attaching the leading edge of the roll of sheet material substantially across the width of said roll to said backing member, said first adhesive layer extending across the width of said backing member from substantially the first longitudinal edge of said backing member to a first position towards the centre thereof; and a second adhesive layer on a first face of said backing member for attachment to said further sheet material, said second adhesive layer beginning at or beyond, but not overlapping with said first position and extending across the width of said backing member to a second position towards the second longitudinal edge of said backing member;

wherein said pre-formed attachment portion is connected to and distributed along said splicing portion and releasably and self-supportively attaching said splicing tape to the outer surface of said underlying winding of said roll of sheet material substantially across the width of said roll, said attachment portion including a third adhesive layer on said backing member for releasing at least said splicing portion from said underlying winding of said first roll while leaving the outer surface of said underlying winding in a non-tacky condition.

In addition the invention provides a method for preparing a splice between the leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, said splicing portion comprising:

an elongate backing member having two faces and two longitudinal edges, a first adhesive layer on said backing member, said first adhesive layer being provided for attaching the leading edge of said roll of sheet material substantially across the width of said roll to said splicing tape and extending across the width of said backing member from substantially the first longitudinal edge of the backing member to a first position towards the centre thereof; and and a second adhesive layer on a first face of said backing member and being covered by a least one release foil, said second adhesive layer being provided for attachment to said further sheet material, said second adhesive layer beginning at or beyond, but no overlapping said first position and extending across the width of said backing member to a second position towards the second longitudinal edge of said backing member;

wherein said pre-formed attachment portion is connected to and distributed along said splicing portion for self-supportively and releasably attaching said splicing tape to the outer surface of the underlying winding of said roll of sheet material substantially across the width of said roll, said attachment portion including a third adhesive layer on said backing member for releasing at least said splicing portion from the underlying winding of said roll while leaving the outer surface of the underlying winding in a non-tacky condition, said method comprising the steps of:

attaching said splicing tape to the outer surface of said underlying winding using said third adhesive layer on said backing member substantially across the width of said roll;

attaching said leading edge to said first adhesive layer, and separating said attachment portion from said splicing portion attached to said leading edge while leaving the outer surface of said underlying winding in a non-tacky condition.

Further the invention provides a method for making a splice between the leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, said splicing portion comprising:

an elongate backing member having two faces and two longitudinal edges;

a first adhesive layer on said backing member, said first adhesive layer being provided for attachment of the leading edge of the roll of sheet material substantially across the width of said roll to said splicing tape and extending across the width of said backing member from substantially the first longitudinal edge of the backing member to a first position towards the centre thereof, and a second adhesive layer on a first face of said backing member and being covered by at least one release foil, said second adhesive layer being provided for attachment of said backing member to the further sheet material, said second adhesive layer beginning at or beyond, but not overlapping said first position and extending across the width of said backing member to a second position towards the second longitudinal edge of said backing member;

wherein said pre-formed attachment portion is connected to and distributed along said splicing portion for self-supportively and releasably attaching said splicing tape to the outer surface of the underlying winding of said roll of sheet material substantially across the width of said roll; said attachment portion including a third adhesive layer on said backing member for releasing at least said splicing portion from said underlying winding of said roll while leaving the outer surface of the underlying winding in a non-tacky condition, said method comprising the steps of:

attaching said splice tape to the outer surface of said underlying winding using said third adhesive layer on said backing substantially across the width of said roll, attaching said leading edge to said first adhesive layer, exposing said second adhesive layer, attaching the further sheet material to the exposed second adhesive layer, and releasing said leading edge and said splicing portion attached thereto from said underlying winding while leaving the outer surface of said underlying winding non-tacky.

The invention provides yet a further splicing tape for splicing the leading edge of a roll of sheet material to a further sheet material, each winding of said sheet material on said roll having an outer surface facing radially outwards away from said roll, comprising:

a splicing portion and a pre-formed attachment portion, said splicing portion comprising:

an elongate backing member;

an adhesive layer on said backing member, a first part layer of said adhesive layer being provided for attachment of the leading edge of the roll of sheet material substantially across the width of said roll to said backing member and a second part layer of said adhesive layer being for attachment to said further sheet material;

wherein said preformed attachment portion is connected to and distributed along said splicing portion for releasable and self-supportive attachment of said splicing tape to the outer surface of the underlying winding of said roll of sheet material substantially across the width of said roll, said attachment portion being adapted for releasing at least said splicing portion from said underlying winding of said roll while leaving the outer surface of said underlying winding in a non-tacky condition and said attachment portion includes a stretch releasable adhesive layer.

The present invention may provide the advantage of a splicing tape for a low step profile splice which can pass through subsequent coating and printing machinery smoothly.

Further the splicing tape in accordance with the invention may be applied quickly and accurately.

In addition the splicing tape may have improved environmental compatibility.

The invention may also provide ways of overcoming the blocking phenomenon with weakly adhering adhesive layers.

Additional embodiments of the invention are given in the dependent claims.

Further advantages and embodiments of the invention are described in the following with reference to the drawings.

DETAILED DESCRIPTION OF THE PREFERRED EMBODIMENTS

In the following description of the preferred embodiments of the present invention the same reference signs are used for similar components of the splicing tape throughout the figures.

It should be noted that the thickness of adhesive layers, foils and backing tapes have been exaggerated in the figures for clarity purposes. In the present application the surface of a winding facing radially outwards from the roll is referred to as the outer surface of that winding.

Figure 3B:
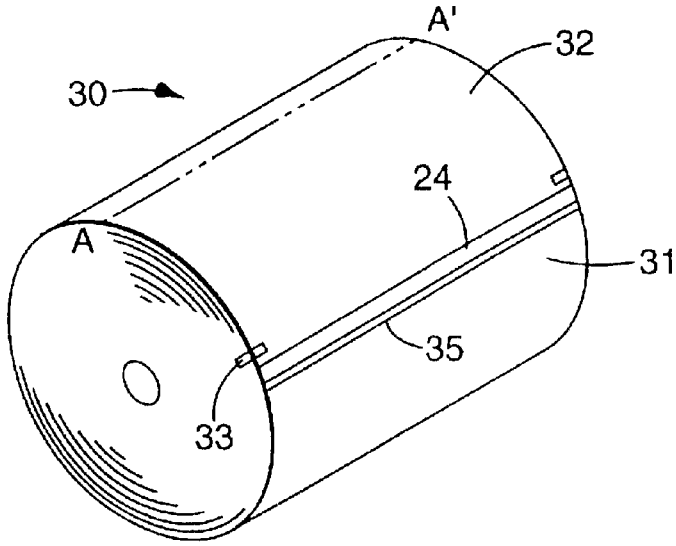
Fig. 3B (Prior Art)
FIG. 3B shows the roll preparation of a conventional permanent splice.
Figure 4:
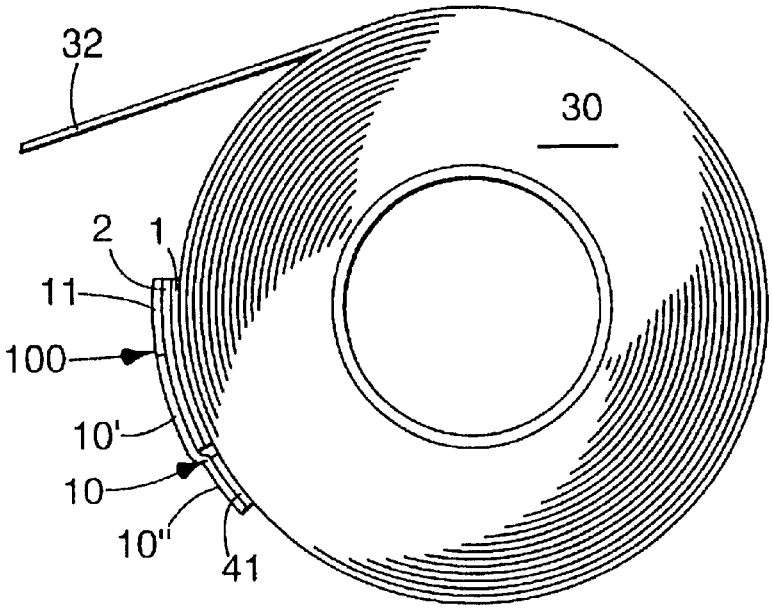
FIG. 4 shows a butt splice in accordance with the first embodiment of the invention.
Figure 5A:
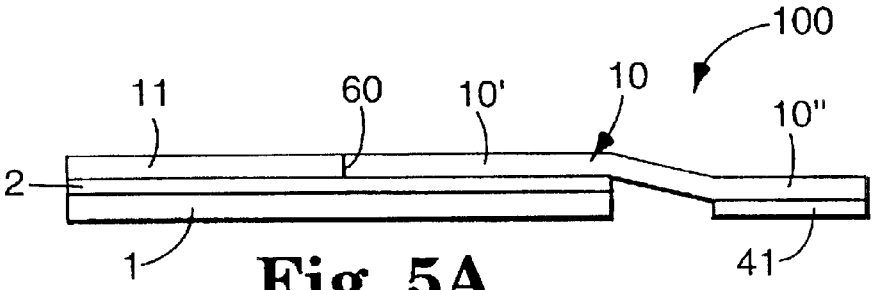
FIGS. 5A to 5C show the first embodiment of a butt splicing tape in accordance with the present invention.

FIG. 5A shows a first embodiment of the present invention constructed as a butt splicing tape in particular for forming a permanent butt splice between two sheet materials in particular paper. FIG. 4 shows the way in which the splice, according to FIG. 5A, can be made using the method of the invention, even when using very wide webs, and without requiring more than one operator to make the splice. In FIG. 4 the same parts as in FIG. 3B are indicated by the same reference numbers. End 32 of the last winding must be spliced. Splicing tape 100 is applied to the last preceding paper winding still present on drum 30. Splicing tape 100 comprises a splicing portion including a backing 1 with an aggressively tacky pressure sensitive adhesive layer 2 on one side, a first release foil 11, which extends over approximately half of the width of the adhesive layer on backing 1, and a second release foil 10 comprising a first part 10', located on the remaining surface of the adhesive layer on backing 1, and a second part 10", which extends beyond the longitudinal edge of backing 1 and which has a layer of adhesive 41 and which leaves no substantial quantities of adhesive on the substrate when attached and subsequently removed therefrom. The adhesive layer 41 may be made to adhere to the release foil 10 by priming the respective part of the surface of the release foil 10. Further, the adhesive layer 41 need not be applied continuously along the release foil 10 but may be applied intermittently along its length. Further the adhesive layer 41 may be applied over the whole surface of the release foil 10.

Splicing tape 100 is temporarily attached to the last paper winding still on the drum with an attachment portion provided by the layer of adhesive 41. In this way, the smooth, non-sticky side of the splicing tape 100 facing the drum is prevented from moving whilst the splice is being made, and does not have to be held in place by a large number of operators. Release foil 11 is then removed, as a result of which a part of the sticky side of splicing tape 100 is exposed onto which web end 32 is fixed in such a way that the edge of this end is close to the edge of release foil 10. If part of the web 32 extends over the release foil 10, it can be torn off straight, as is usual in the paper industry, at the transition between foil 11 and release foil 10. After this, splicing tape 100 can no longer move with respect to the web end 32, because it is fixed to end 32. Release foil 10 can now also be removed entirely, which means that the remaining part of adhesive layer 41 comes away from the underlying winding as well as the splicing tape 100. It is preferable that, when release foil 10 is removed, adhesive 41 leaves no substantial quantities of adhesive on the underlying paper winding, i.e. it leaves a non-tacky surface, since this adhesive may otherwise disrupt the way the paper is subsequently printed.

Figure 1A:
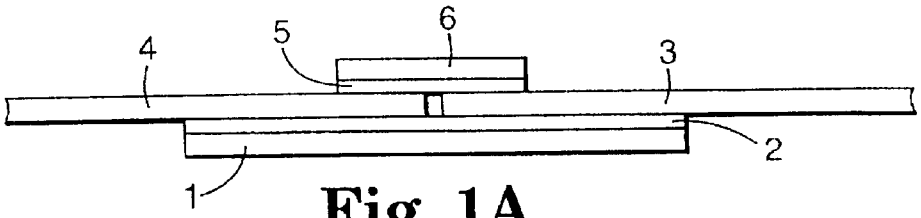
Fig. 1A (Prior Art)
FIGS. 1A to 1C show various types of permanent splices.
Figure 1B:
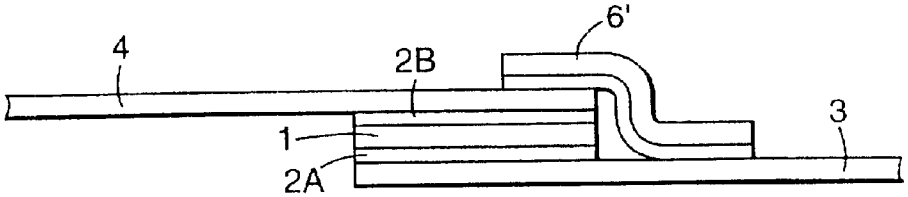
Fig. 1B (Prior Art)
Figure 1C:
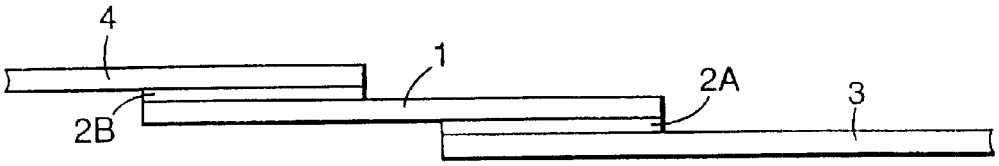
Fig. 1C (Prior Art)
Figure 2A:
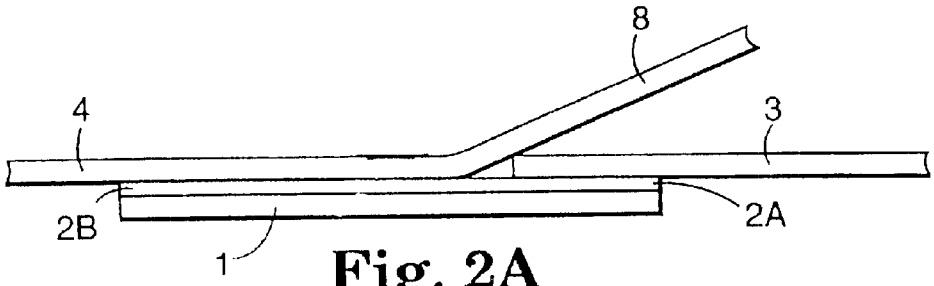
Fig. 2A (Prior Art)
FIGS. 2A and 2B show various types of flying splices.
Figure 2B:
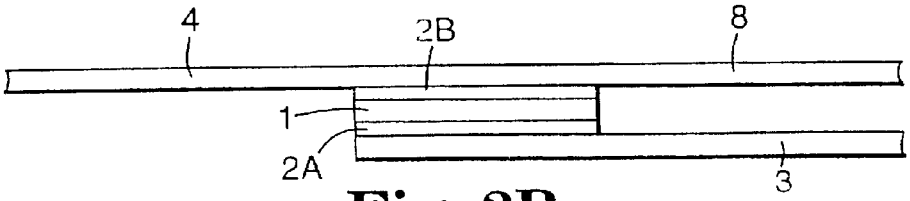
Fig. 2B (Prior Art)

After removal of release foil 10, the further end of the other web can be fixed on the exposed part of the adhesive layer 2 of splicing tape 100. Any part of the further end extending over web part 32 can again be torn off to the correct length in order to form a neat splice. For the sake of clarity, this end is not shown in FIG. 4. Covering adhesive tape 6 can now simply be applied over the splice thus formed as shown in FIG. 1A, preventing adhesive from splicing tape 100 from escaping via the splice to the side of the web opposite splicing tape 100, which can cause faults when printing the paper.

An additional advantage of the method according to the invention is that, after removing the second release foil 10, the paper reel can be rotated in order, if necessary, to simplify application of the further end of sheet material.

The backing 1 is typically similar in strength and flexibility to the sheet materials to be joined and may be plastic or paper or any similar sheet material. When paper sheets are to be joined it is preferable if the backing material 1 as well as all other materials which remain in the completed splice are repulpable and/or water soluble and/or water dispersible. The thickness of the backing is typically in the range 50–100 micro meters and the width is typically 50–100 millimeters. The surface of the backing 1 should preferably be coatable and/or printable. Suitable materials for joining paper rolls would be super calendered (glassine) or semi-bleached Kraft paper. On one side of the backing 1 an aggressive pressure sensitive adhesive (PSA) layer is applied which may be continuous across the width of the tape as shown in FIG. 5A or may consist of two separate strips of adhesive with a gap there between. The PSA may be an adhesive of the acrylic, rubber resin, silicone or similar types. It is preferable if the PSA is repulpable. It is particularly preferred if the PSA is a repulpable acrylic adhesive. The thickness of the PSA layer may be typically 2 to 100 micrometers. The PSA layer is protected by a release foil 10, 11 which is provided with a longitudinal weakness or perforation in the middle thereof The release foils 10, 11 may also be two separate release foils 10 and 11 adjacent to each other or a single release foil which has been slit in the centre. The release foils may be of any suitable conventional kind, e.g. silicon or waxed papers with a typical thickness of 30–150 micrometers. It is preferable but not necessary for the invention if the release foils are repulpable.

The above description of the first embodiment demonstrates certain aspects of the present invention. Firstly, a portion of the splicing tape 100, namely a part 10" of the release foil 10 and the adhesive layer 41, is connected to and distributed along the splicing portion 1, 2. This attachment portion 10", 41 is used to temporarily attach the splicing tape 100 to the roll of sheet material. This attachment portion of the splicing tape 100 is sufficient that the splicing tape is self-supporting on the roll, i.e. when applied in a straight line it is capable of supporting its own weight without sagging or pulling.

Secondly, the attachment portion of the splicing tape 100 may be separated from the splicing portion 1, 2 by removing the release foil 10 from the PSA layer 2. This separation of the attachment portion of splicing tape 100 from the splicing portion 1, 2 may be carried out by different means (foil 10, PSA 2) than means for detachment of the attachment portion from the underlying sheet material. Separation of the attachment portion from the splicing tape 100 is sufficient to release the splicing portion 1, 2 from its temporary attachment to the sheet material.

Thirdly, the attachment portion of the splicing tape may be detached from the underlying winding while leaving the outer surface of this winding non-tacky. Detachment of the attachment portion from the underlying sheet material is also sufficient, independent of separation of the attachment portion from the splicing tape 100, to release the splicing tape 100 from its temporary attachment to the sheet material.

Thus, in accordance with the present invention the splicing tape 100 may be temporarily attached to the roll of sheet material and subsequently released therefrom without leaving exposed adhesive material on the outer surface of the underlying winding of sheet material, i.e. leaving a non-tacky outer surface which can be machine coated and/or printed.

The adhesive layer 41, shown in FIG. 5A is preferably a stretch releasable adhesive layer 41. A stretch releasable adhesive has the property of losing tackiness when its backing material is stretched in the tape longitudinal direction. To remove the release foil 10 one end of thereof is stretched in a longitudinal direction which detackifies the adhesive at this end. The operator works, across the width of the roll, detackifying the adhesive 41 by extending the release foil 10. After removal no substantial quantities of adhesive are left adhering to the surface of the underlying winding, i.e. the surface is non-tacky.

It is necessary to provide a release foil 10 with appropriate extensive properties. A reusable stretch release tape is described in EP-0563057. Extension of the tape detackifies the adhesive coating and the tape returns to its original length on release and the adhesive regains its adhesive properties. Such a tape can be reapplied to the remaining splice tape 1, 2, 11 which can be repositioned as above.

A non-re-usable stretch release tape is described in EP-0563272. After extension of the tape the adhesive is detackified but the tape remains extended and must be discarded.

Figure 5B:
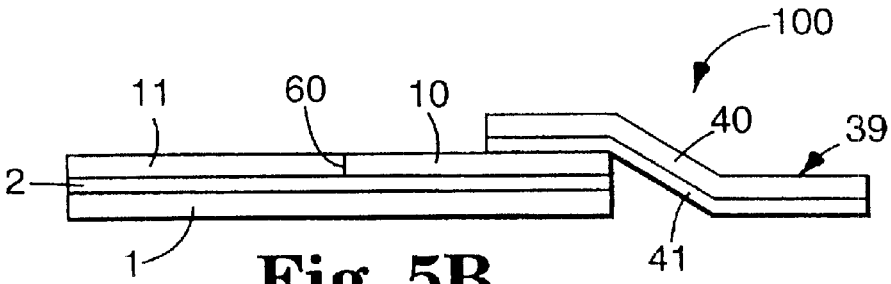

FIG. 5B shows a modification of splicing tape 100 according to the first embodiment of the invention and is made from materials similar to those described for FIG. 5A.

Release foils 10 and 11 are similar to those for the adhesive tape according to FIG. 5a, but foil 10 is now approximately the same width as foil 11. An additional adhesive tape 40, 41 is pre-applied to, i.e. connected to and distributed along the free side of foil 10, which comprises a backing 40 and, on one face of it, the slightly adhering adhesive layer 41. Tape 40, 41 extends over the side edge of foil 10 and provides the attachment portion of the splicing tape 100 for temporary attachment to the web on reel 30 in the same way as in FIG. 5A.

The further adhesive tape 40, 41 is removably attached in an overlapping fashion to the release foil 10 as shown in FIG. 5B. The adhesive layer 41, is preferably a stretch releasable adhesive layer 41. The backing 40 may be any suitable stretchable backing material and is not necessarily repulpable or water soluble as this layer is subsequently removed from the splice. It is, however, preferable if all materials used in the splicing tapes in accordance with the invention are recyclable, and/or repulpable. The backing layer 40 is typically 15–50 mm wide.

The adhesive tape 40, 41 may be applied continuously on the length of the main splice tape 1, 2, 10, 11 or discrete lengths of the adhesive tape 40, 41 may be pre-applied intermittently, i.e. distributed along the main splice tape 1, 2, 10, 11. The spacing for the intermittent adhesive areas should be sufficient to maintain the splicing tape 100 in a self-supporting manner when applied to the roll.

The application of the splicing tape as shown in FIG. 5B to the roll is similar to that described for the splicing tape as shown in FIG. 5A. The connection of the web end 32 is similar to the method described with respect to FIG. 5A.

When the splice is to be made to the trailing edge of a second roll the release foil 10 and the adhesive tape 40, 41 are removed separately so as to expose the remaining part layer of PSA 2. The trailing edge of the second roll is then aligned with the first roll 30 and attached to the splicing tape by pressing the trailing edge against the exposed PSA layer 2. Any excess sheet material of the trailing edge can be removed by folding against the adhesive join and tearing or cutting as described above with respect to the leading edge of the first roll. The junction between the leading and trailing edges in the centre of the splice may then covered by a further narrower adhesive tape 6 as has been described with respect to FIG. 1A.

With the modification of the first embodiment in accordance with FIG. 5B the means for separating the attachment portion 40, 41 of the splicing tape 100 from the rest of the splicing tape 100 as well as the means for detaching the attachment portion 40, 41 from the sheet material are provided by the stretch releasable adhesive layer 41.

Figure 5C:
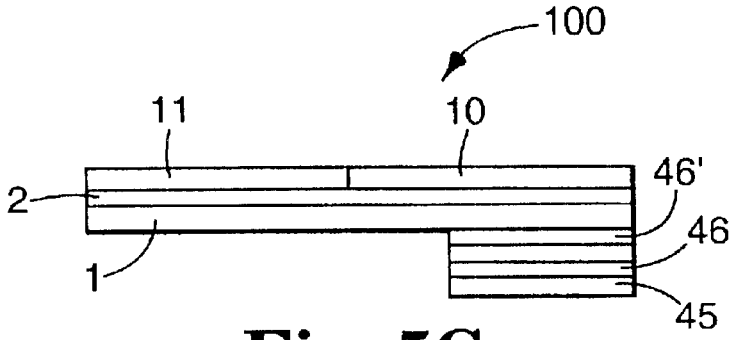

FIG. 5C shows a further modification of the first embodiment in accordance with the present invention of a butt splicing tape 100. Instead of making use of a separate stretch release tape 10,41 or 40,41 as described with respect to FIGS. 5A and B this embodiment uses a double-sided stretch releasable adhesive layer 46, 46' with a release foil 45 pre-applied on the opposite face of the backing 1 from the PSA layer 2. The double-sided stretch release tape 46,46' is preferably applied, i.e. connected to and distributed along one longitudinal edge of the backing 1. The materials used are similar to those described with respect to the embodiments of FIGS. 5A and B. The splicing tape in accordance with the second embodiment of the invention is temporarily attached to the underlying winding 31 of the roll 30 by means of the stretch releasable adhesive layer 46 as the attachment portion. When the splice is to be completed the double-sided stretch releasable adhesive layer is extended in the longitudinal direction parallel to splicing tape 1, 2, 10, 11 starting at one end thereof The extension of the stretch release layer 46, 46' in this direction detackifies the adhesive so that it no longer bonds either to the backing layer 1 or to the underlying winding 31 of the roll 30. Thus the stretch releasable layer 46, 46' may be removed from the splicing area without leaving a substantial residue of tacky adhesive material either on the backing material 1 or on the underlying winding 31 of the roll. If the stretch release tape is of the re-usable type mentioned above the splice tape may be reconstructed and re-used.

As an alternative to the first embodiment of the invention described above, the double sided stretch release tape may be applied intermittently along the length of the backing 1. The stretch release tape 46, 46' is applied so that the stretch direction of the tape is perpendicular to the longitudinal direction of the splicing tape. Extending beyond the backing 1, non-adhesive gripping portions (not shown) are provided on the ends of the lengths of stretch release tape to enable gripping the stretch release tape.

One advantage of using stretch release adhesive layers is that they do not show the blocking phenomenon known with weakly adhering and repositionable adhesive layers.

Figure 6A:
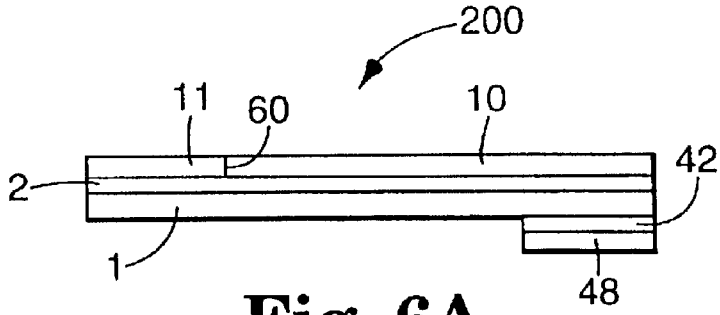
FIGS. 6A and 6G show a second embodiment of a butt splicing tape in accordance with the present invention.
Figure 6B:
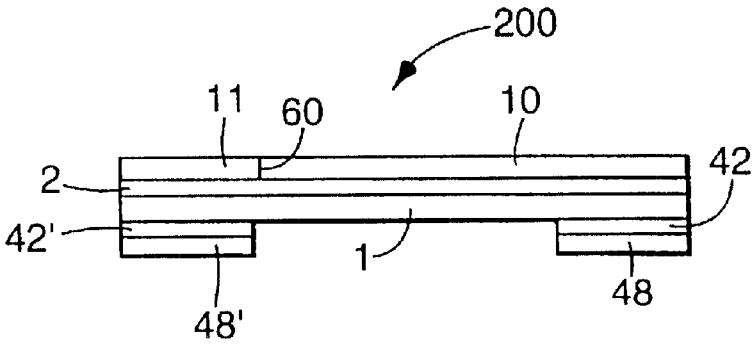

FIG. 6A shows a second embodiment of the present invention relating to a permanent or flying butt splicing tape 200. The splicing tape 200 in accordance with the second embodiment includes a backing 1 covered by an aggressively tacky pressure sensitive adhesive (PSA) 2 which is itself protected by a release foil 10, 11. The release foil 10,11 is provided with a longitudinal weakness, perforation or slit 60. For a flying splice the weakness, perforation or slit 60 is preferably arranged at a position so that the width of the release foil 11 is smaller than the release foil 10. On the opposite face of the backing 1 from the PSA layer 2 a weakly adhering, preferably repositionable adhesive layer 42 is provided with its own release foil 48 and is connected to and distributed along the backing 1 at any suitable position but preferably adjacent to the edge of the splicing tape underneath the release layer 10 as shown. The release foil 48 may be omitted in this embodiment. Further, several strips of repositionable adhesive 42 may be provided across the width of the backing 1 as is shown in FIG. 6B. It is not necessary that the repositionable adhesive layer 42 is continuous along the length of the splicing tape 200. The adhesive may be distributed in discrete lengths therealong provided the splicing tape 200 may be attached to the sheet material across the roll width by means of the discrete repositionable adhesive layers in a self-supporting manner.

The repositionable adhesive layer 42 may be made from any known repositionable adhesive. For the purposes of this invention a repositionable adhesive has a property of adhering to and being removable from the surface of a substrate without transfer of substantial quantities of adhesive material to the substrate surface. This is achieved by making the adhesion of the adhesive layer 42 to the release foil 10 (if necessary by priming the surface of the release foil 10) considerably greater than the adhesion of the adhesive layer 42 to a sheet substrate. Further, after removal it is preferable if the adhesive layer retains substantially its adhesive properties so that it may be reapplied to the same substrate surface. A repositionable adhesive may have a peel strength lower than for a conventional aggressively tacky PSA. In particular, it is preferable if the removal of the repositionable adhesive layer from the paper substrate does not damage the surface fibres of the paper. After detachment printing properties of the paper surface should not deteriorate. Suitable adhesives are those applied to Correction & Cover-up Tape 658 or Scotch Masking Tape 1104 or the repositionable memo pads known as "Post-It" all manufactured by Minnesota Mining and Manufacturing Company, Minn., USA. Further, in accordance with the invention the repositionable adhesive layer is preferably repulpable.

The splicing tape 200 in accordance with the second embodiment is applied in the following way. The release foil 48 is removed from the splicing tape, the leading edge of the first roll of sheet material is lifted and the splicing tape is applied across the width of the roll or in a pattern similar to the one shown in FIG. 3A. The splicing tape is secured to the underlying winding of the roll of sheet material by the repositionable adhesive layer(s) 42. The release foil 11 is then removed exposing the PSA layer 2. The leading edge of the first roll of sheet material is then carefully laid back and is attached to the splicing tape 200 by pressing it against the PSA layer 2. Any excess of the leading edge is torn off against the edge of the PSA layer 2. In this condition the leading edge of the roll of sheet material is secured to the underlying winding of the roll by means of the repositionable adhesive 42 and there are no exposed areas of adhesive so that the roll may be stored in this condition until required.

Figure 3A:
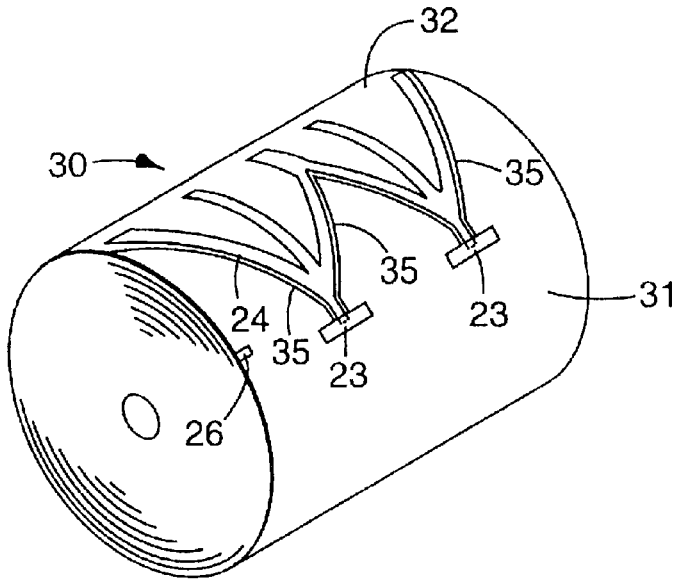
Fig. 3A (Prior Art)
FIG. 3A shows the roll preparation of a conventional flying splice.

Immediately before formation of a flying splice in accordance with the second embodiment, the release foil 10 is removed exposing the large area of PSA 2 and the marker tape 26 is applied as was described with respect to the conventional procedure in accordance with FIG. 3A. The roll is then brought up to machine speed and the trailing edge of the second roll is pressed against the exposed PSA layer at the appropriate moment. Because the adhesion of the repositionable adhesive 42 to the underlying winding of the sheet roll is adapted to be lower than the strength of the sheet material and also of the adhesion of the splicing tape to the trailing edge of the second roll, the repositionable adhesive layer 42 lifts off from the underlying winding of the new roll leaving no adhesive residue. The repositionable adhesive layer 42 is designed in such a way that its adhesion to the sheet material is considerably lower than the aggressive PSA layer 2 and its adhesion to the backing 1 is considerably greater than its adhesion to the sheet material of the roll. As a specific aspect of the present invention it is preferable if all materials left in the splice are repulpable including the repositionable adhesive layer 42.

The butt splicing tape 200 in accordance with the second embodiment may have both release foils 10 and 11 of the same width (not shown) when the splicing tape 200 is used to make a permanent butt splice.

In accordance with the second embodiment the attachment portion of the splicing tape 200 is provided by the adhesive layer 42. The means for detaching the attachment portion 42 is provided by the adhesive layer 42 being weakly adhering, preferably repositionable. Detachment of the splice between the interface of the adhesive layer 42 and the underlying winding leaves a non-tacky outer surface. Further the splicing tape in accordance with the second embodiment includes an elongate backing member I and a first adhesive layer (left hand part of layer 2 in FIG. 6A) on the first face of the backing 1 and extending substantially from one longitudinal edge of the backing 1 towards the centre of the tape up to a first position and a second adhesive layer on the first surface of the backing 1 (the right hand part of layer 2 in FIG. 6A) beginning at or beyond, but not overlapping the first position and extending across the tape towards the second longitudinal edge of the backing 1 up to a second position. The weakly adhering layer 42 is a third adhesive layer for attaching the backing 1 to the underlying winding of the roll and for release therefrom while leaving a non-tacky surface on the winding.

One problem with weakly adhering and repositionable adhesives can be their tendency to adhere more strongly with time depending on pressure, time and temperature. This phenomenon is known as "blocking".

Figure 6C:
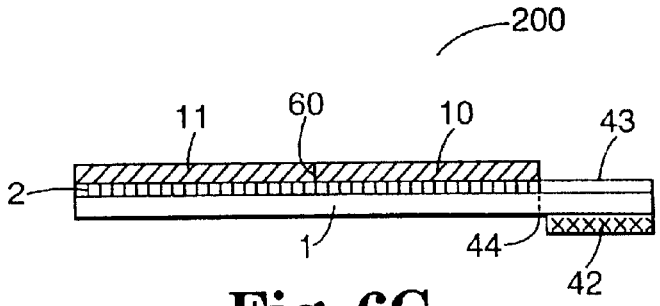
Figure 6D:
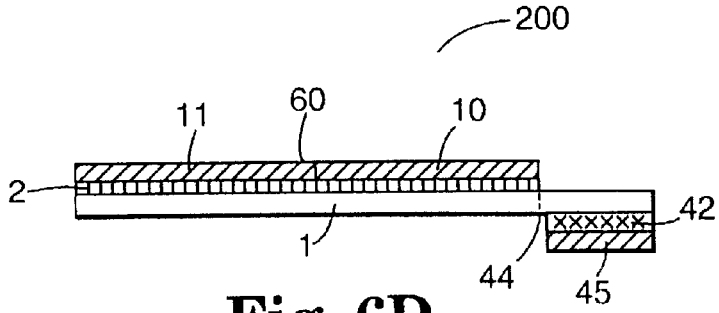

A further modification of the second embodiment of the present invention is shown in FIG. 6C in which a weakly adhering, preferably repositionable adhesive layer 42 is applied to an extension of the backing 1. Between the end of the PSA layer 2 and the start of the repositionable adhesive layer 42 a longitudinal weakness or perforation 44 may be preformed in the backing 1. The repositionable adhesive layer 42 may be provided with a separate release foil as shown in FIG. 6D or the opposite surface of the backing 1 to the repositionable adhesive layer 42 may be provided with a release layer 43 as shown in FIG. 6C. Hence, when the complete splice tape 200 is formed into a roll, the bonding strength of the repositionable adhesive layer 42 to the opposite side of the backing 1 does not increase during storage. The application of the splicing tape in accordance with FIG. 6C is similar to that as described for FIGS. 6A and B in that the repositionable adhesive layer 42 is used as the attachment portion to provisionally secure the splicing tape to the underlying winding 31 of the roll 30. When a permanent splice is to be completed the repositionable adhesive layer 42 as well as the part of the backing material 1 attached thereto may be removed by tearing along the weakness or perforation 44. In accordance with the modification of the second embodiment described above with reference to FIG. 6C the means for separating the attachment portion, 42 from the backing 1 is provided by the longitudinal weakness/perforation 44. The means for detaching the attachment portion 1, 42 from the sheet material is provided by the weakly adhering adhesive layer 42. However in the case that the adhesion of the adhesive layer 42 increases so that it "blocks" the separation along the weakness/perforation 44 can be relied on to release the splice from the underlying winding. The section of the tape 200 with the adhesive layer 42 remains on the underlying winding with a non-tacky surface facing away therefrom.

As an alternative, when in particular a flying butt splice is completed with the embodiment described with reference to FIG. 6C, the splice lifts from the underlying winding by detachment along the repositionable adhesive/sheet material interface. In this case the longitudinal weakness/perforation 44 provides additional lift-off security in case of blocking or may be omitted.

Figure 6E:
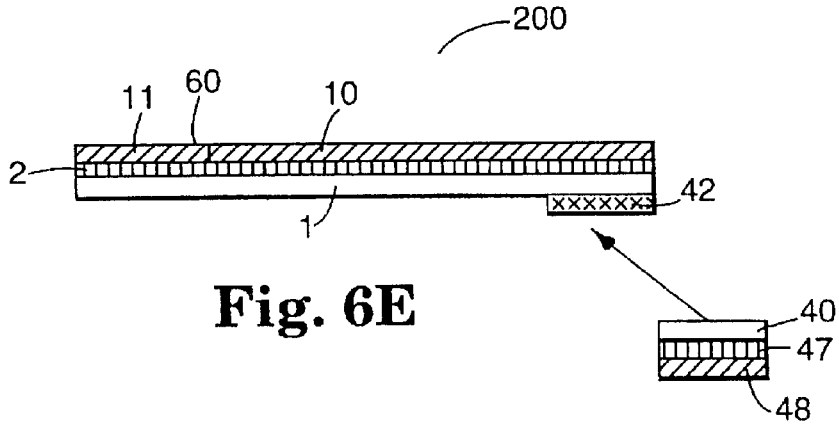

FIG. 6E shows a modification to the splicing tape 200 shown in FIG. 6A. A single sided high tack adhesive tape 40, 47, 48 comprising a backing 40, a high-tack PSA layer 47 and a release foil 48 may be pre-applied to the weakly adhering adhesive layer 42 with the backing 40 adjacent to this adhesive layer 42. The splicing tape is applied to the roll by first removing release foil 48 and then attaching the exposed PSA layer 47 to the roll.

The ends of the sheet material are butt spliced on the splicing tape 200 without removing the single-side tape 40, 47. When the sheet material separates from the roll the splice detaches itself from the underlying winding along the interface of the weakly adhering adhesive layer 42 and the backing 40. The backing 40 forms part of the non-tacky outer surface of the underlying winding. The single sided high tack adhesive tape 40, 47, 48 may be applied as a separate tape to the roll of sheet material or may be pre-applied to the splicing tape as described above.

Figure 6F:
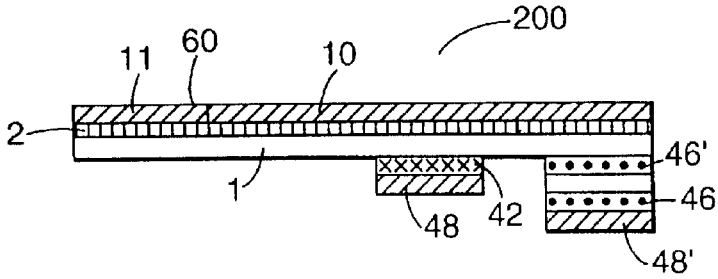
Figure 6G:
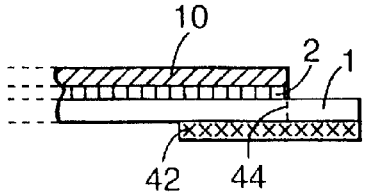

If greater security is required when fixing and working with the splicing tapes in accordance with the first and second embodiments as shown in FIGS. 5C and 6A to E, a double-sided stretch releasable adhesive tape layer 46, 46' and a repositionable layer 42 may be provided along the edge of the splicing tape as shown in FIG. 6F. The tape 46, 46' is removed before completion of the splice. A similar effect can be achieved by applying an additional weakly adhering adhesive layer preferably a repositionable adhesive layer 42 to the extension of backing 1 which can be removed by tearing along a weakness or perforation 44 (FIG. 6G) between the main body of the splicing tape 200 and the extension of the backing before the splice is completed.

Figure 7A:
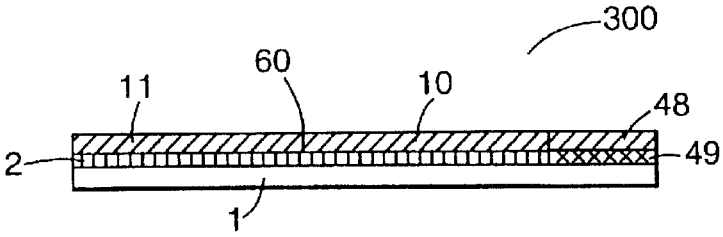
FIGS. 7A to 7F show a third embodiment of a butt splicing tape in accordance with the present invention.
Figure 7E:
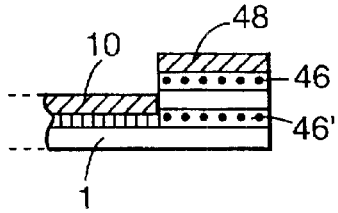
Figure 7B:
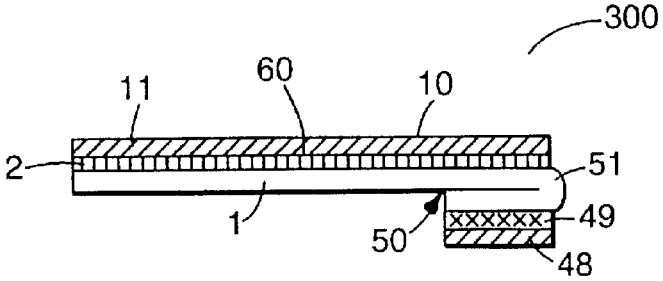
Figure 7F:
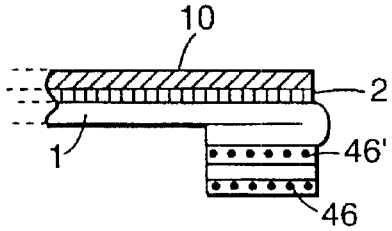
Figure 7C:
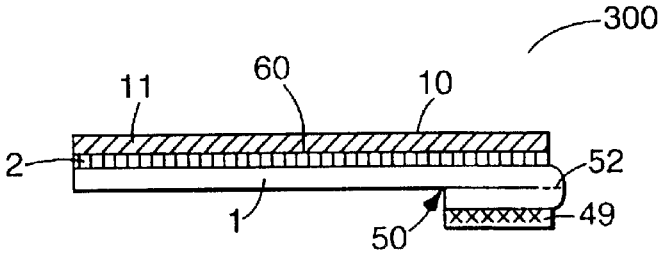
Figure 7D:
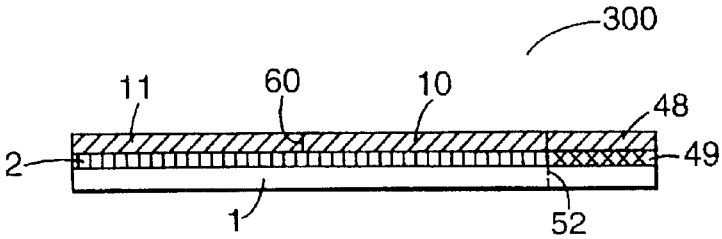

FIG. 7A shows a third embodiment of the present invention relating to a butt splicing tape 300. The butt splicing tape 300 in accordance with the third embodiment comprises a backing material 1, a PSA layer 2 which extends across the majority of the width of the backing 1 and is provided with release foil 10, 11 in the same way and from the same materials as described with respect to the first and second embodiments. On an extension of the backing 1 and adjacent to the release foil 10 a layer 49 of weakly adhering preferably repositionable adhesive (FIG. 7A) or a double side stretch releasable adhesive layer 46, 46' (FIG. 7E) is applied to the backing 1 and is covered by a release foil 48 which is separable from the release foil 10. In use the section of the splicing tape 300 which includes the stretch releasable or repositionable adhesive 46, 46'; 49 is folded over to form a crease 51 as shown in FIG. 7B and FIG. 7F, respectively. The tape may also be delivered in the prefolded form as shown in FIG. 7B and 7F. The tape is applied to the underlying winding B1 of the roll 30 by removing the release foil 48 and applying the stretch releasable 46 of repositionable adhesive 49 to the underlying winding 31 of the roll 30 as has been described with respect to the first and second embodiments. In the modification to the third embodiment shown in FIG. 7B the separate release foil 48, for the repositionable adhesive layer 49 is optional as shown in FIG. 7C. After the leading edge of the roll 30 is applied to the PSA layer below the release foil 11 the splice may be completed by separating the section of the backing 1 which is coated with the repositionable adhesive layer 49 by introducing a knife at the junction 50 between the two parts of the backing tape 1 and slitting the weakened creased section 51 of the backing 1. Alternatively, a longitudinal weakness or perforation 52 can be preformed in the tape at this position during manufacture of the splicing tape as is shown in FIG. 7C. The tape as manufactured may then appear as in FIG. 7D before folding.

Slitting or perforation of the backing 1 is not necessary with the modification including the stretch releasable adhesive layer 46, 46' shown in FIG. 7B as it may be removed by longitudinal extension as described with respect to FIG. 5C. A gap may be provide between the end of the PSA layer 2 (the second position on the tape) and the adhesive layers 49 and 46,46'.

When the splicing tape 300 as shown in FIGS. 7A to 7F is used as a flying butt splice the section of the backing 1 coated with repositionable adhesive 49 is not separated by slitting as described above. The repositionable adhesive secures the nose of the leading edge as the roll is brought up to machine speed. The completed splice lifts from the underlying winding by separating along the repositionable adhesive/sheet material interface. In this case the weakness or perforation is not required but can be included for additional lift-off security in case of "blocking".

Figure 8A:
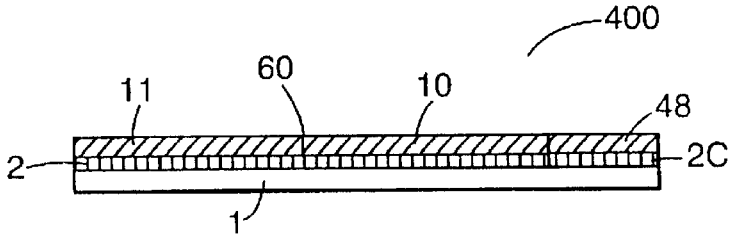
FIGS. 8A to 8E show a fourth embodiment of a butt splicing tape in accordance with the present invention.
Figure 8B:
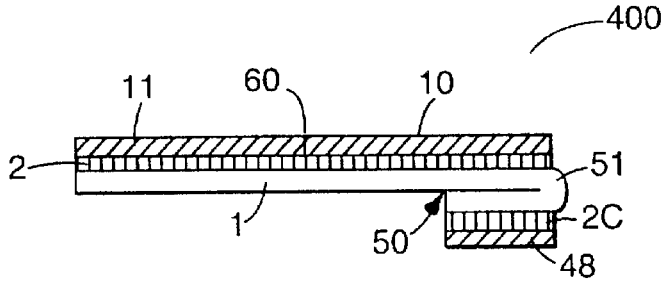
Figure 8C:
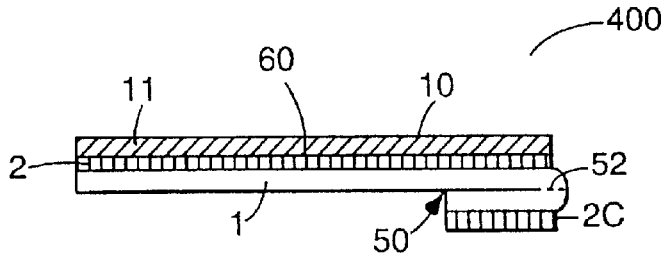
Figure 8D:
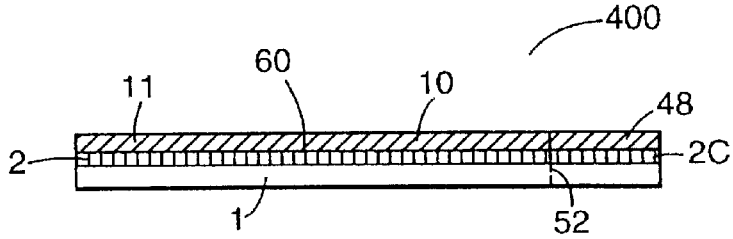

FIG. 8A shows a fourth embodiment of the present invention relating to a butt splicing tape 400 which is made from similar materials as used for the butt splicing tape 300 of the third embodiment shown in FIG. 7A except that the repositionable adhesive layer 49 is replaced by an extension of the pressure sensitive layer 2. The splicing tape 400 in accordance with the fourth embodiment is applied in a similar way to that of the third embodiment shown in FIG. 7A, i.e. the section of the tape below the release foil 48 is folded over as shown FIG. 8B or is delivered in this form. The release foil 48 is removed and the section of the PSA 2C thereunder is attached to the underlying winding 31 of the roll 30. The leading edge of the roll 30 is secured to the PSA layer 2 lying below the release foil 11. When the splicing tape is used to form a permanent butt splice the section of the backing 1 which is coated with the PSA layer 2C is separated from the main splice tape by introducing a knife at the point 50 and slitting the weakened crease 51 of the backing 1. Alternatively, as has been described with respect to the third embodiment and FIG. 7C a longitudinal weakness or perforation 52 may be provided at this position in order to ease separation of the section of the backing tape 1 coated with the pressure sensitive adhesive 2A as is shown in FIG. 8C. Further, the release foil 48 may be omitted from the tape as shown in FIG. 8C. A modification of the fourth embodiment of the present invention which includes the weakness or perforation 52 is shown in FIG. 8D before folding. A gap may be provided between the end of the PSA layer 2 at the second position and the PSA layer 2C.

Figure 8E:
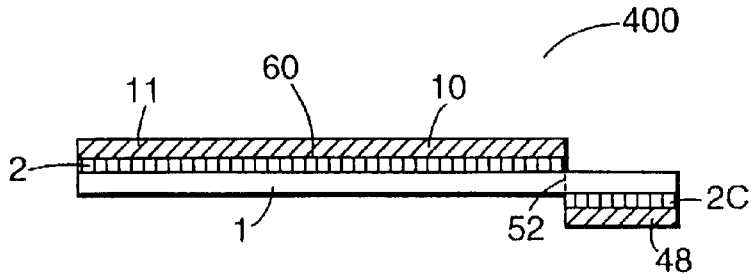

FIG. 8E shows a further modification of the fourth embodiment of the present invention relating to a permanent or flying butt splicing tape 400 made from materials similar to those described with respect to the first embodiment. The backing 1 is extended beyond the PSA layer 2 covered by the release foils 10 and 11 and a further PSA layer 2C is applied to a portion of the extended backing 1 on the opposite side thereof from the PSA layer 2. The PSA layer 2C has its own release foil 48. A longitudinal weakness or perforation 52 is provided at a position between the end of the PSA layer 2 and the beginning of the PSA layer 2C and for this purpose it is advisable to have a gap between the end of the PSA layer 2 and the beginning of the PSA layer 2C of between 1 and 5 mm. The splicing tape in accordance with this modification of the fourth embodiment is applied to the underlying winding 31 of the roll 30 by removal of the release foil 48 and by attaching the exposed PSA layer 2C to the underlying winding 31 of the roll 30 across its width. The splice is then completed by attaching the leading and trailing edges of the first and second roll to the PSA layer 2. The splice tears along the weakness or perforation 52 when the trailing edge of the second roll pulls away the leading edge 31 of the first roll 30. For this purpose it is advisable to make the weakness or perforation 52 such that the force required to break the connection of the backing 1 at the position 52 is lower than the adhesive force of the PSA layer 2C to the underlying sheet material and is also lower than the force required to tear the sheet material of the roll 30.

With the fourth embodiment of the present invention described with respect to FIGS. 8A to 8E the means for separation of the attachment portion 1, 2C from the splicing tape 400 is provided by the crease 51 or the longitudinal weakness/perforation 52.

Figure 9A:
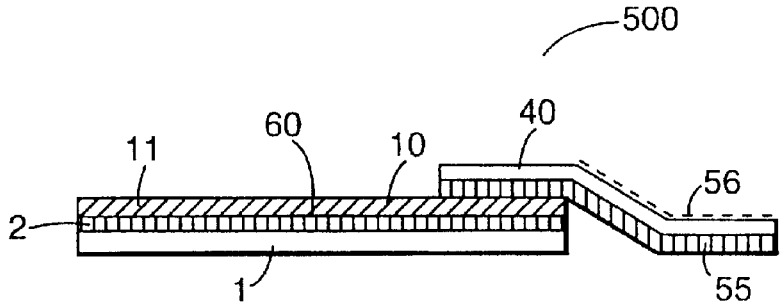
FIGS. 9A to 9C show a fifth embodiment of the butt splicing tape in accordance with the present invention
Figure 9B:
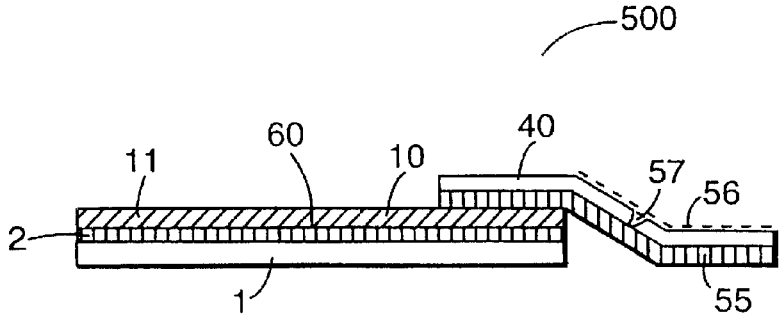

The splicing tape as shown in FIGS. 8C and 8E may be used as a flying butt splice. In this case the section of the backing 1 is not slit as described above. When the splice lifts from the underlying sheet material the slice is separated from the adhesive layer 2C by tearing along the weakness or perforation 52. For this purpose it is advisable to make the weakness or perforation 52 such that the force required to break the connection of the backing 1 at the position 52 is lower than the adhesive force of the PSA layer 2C to the underlying sheet material and is also lower than the force required to tear the sheet material of the roll 30. FIG. 9A shows a fifth embodiment of the present invention relating to a butt splicing tape 500 and is a modification of the first embodiment. With the fifth embodiment the repositionable adhesive layer 41 on the backing 40 is replaced by a pressure sensitive adhesive layer 55. The PSA layer 55 is provided with its own release foil or alternatively the side of the backing 40 away from the PSA 55 is coated with a release layer 56 as shown in FIG. 9A. The splicing tape 500 in accordance with the fifth embodiment is applied in a similar way to the splicing tape of the first embodiment except that the PSA layer 55 is attached to the underlying winding 31 of the roll 30 and cannot be subsequently removed therefrom. Accordingly, when the splice is to be completed the backing layer 40 is removed from or with the release foil 10 and is torn off against the part of the backing layer 40 which is attached to the underlying winding 31 of the roll 30 by means of the PSA layer 55. Tearing off the excess of the backing 40 may be made easier by the provision of the longitudinal weakness or perforation 57 in the backing 40 as shown in FIG. 9B. The part of the backing 40 left on the underlying winding forms part of its non-tacky outer surface. The remaining steps in the application of the tape are as described in the first to fourth embodiments.

Figure 9C:
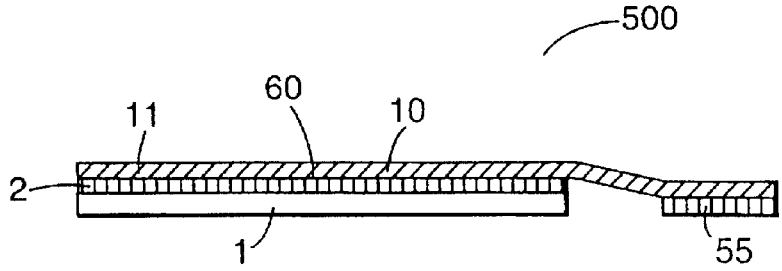

A modification of the fifth embodiment of the present invention is shown in FIG. 9C in which the release foil 10 is extended beyond the backing 1 and is coated with a further PSA layer 55. To assist coating the release foil surface is primed in the region of the PSA layer 55. The exposed part of the PSA layer 55 may have its own release foil but this is not necessary. The modification of the fifth embodiment in accordance with FIG. 9C may also be provided with a longitudinal weakness or perforation 57 in the release foil 10 (not shown) as has been described with respect to the splicing tape in accordance with FIG. 9B.

Figure 10A:
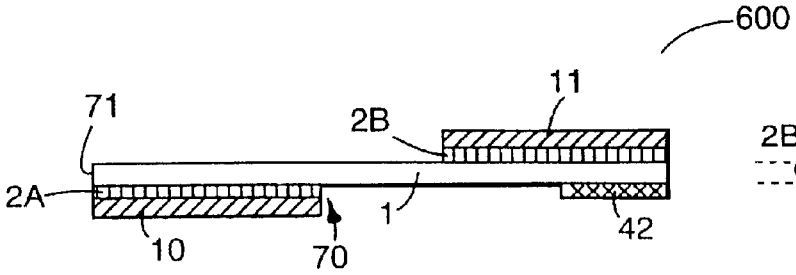
FIGS. 10A to 10E shows a sixth embodiment of a staggered overlap splicing tape in accordance with the present invention.
Figure 10D:
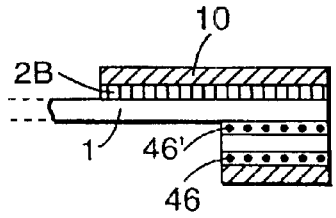

FIG. 10A shows a sixth embodiment of the present invention relating to a staggered overlap splicing tape 600. The splicing tape 600 comprises a backing 1 a first adhesive layer 2A of PSA on the second face of the backing 1, the first adhesive layer extending from a first longitudinal edge of the backing 1 towards the middle of the tape up to a first position and a second adhesive layer 2B on the first face of the backing 1 and beginning at or beyond, but not overlapping the first position and extending up to a second position towards the second longitudinal edge of the backing 1. The PSA adhesive layers 2A and 2B are provided with release foils 10 and 11. The materials used to make the splicing tape 600 are similar to those described with respect to the first and second embodiments. The release foil 10 may be omitted if the opposite face of the backing 1 to the PSA layer 2A is provided with a release layer. A layer of stretch releasable 46, 46' or repositionable adhesive 42 is provided on the opposite face of the backing layer 1 from the PSA layer 2B and may have its own release foil (not shown). The width of the stretch release layers 46, 46' (FIG. 10D) or repositionable adhesive layer 42 (FIG. 10A) may be less than the PSA layers 2A or 2B. The splicing tape 600 in accordance with the sixth embodiment is applied in the following way. First, the leading edge of the first roll is cut to the desired shape either across the width as is shown in FIG. 4 or to a particular pattern as is shown in FIG. 3A. Without removing the release foil 10 the splicing tape is applied to the underlying winding of the roll of sheet material using the repositionable adhesive layer 42 or stretch releasable layer 46, 46' so that the end 70 of the PSA layer 2A coincides with the cut leading edge of the roll of sheet material. When the layer 42 is a repositionable adhesive layer, the tape 600 may be adjusted in its position several times in order to obtain a close fit between the edge 70 of the PSA layer 2A and the cut leading edge of the last layer of the sheet material. When the correct position has been obtained the edge 71 of the splicing tape is raised sufficiently to remove the release foil 10 and the splicing tape is then pushed down against the leading edge of the last layer of the roll of sheet material so as to join the splicing tape to the leading edge by means of the PSA layer 2A.

Prior to completion of the splice the double-sided stretch release tape 46, 46' (if present) is removed.

When it is required to complete the splice the release foil 11 is removed thus exposing the PSA layer 2B. The connection to the trailing edge of the second roll is carried out in accordance with the previous embodiments depending on whether the splicing tape is used to form a permanent splice or a flying splice. In the latter case it is preferable to make the width of the PSA layer 2B considerably wider than the PSA layer 2A as has been described with respect to the seventh embodiment and the repositionable adhesive layer 42 is preferred. Further the repositionable adhesive layer 42 is preferably repulpable.

Figure 10B:
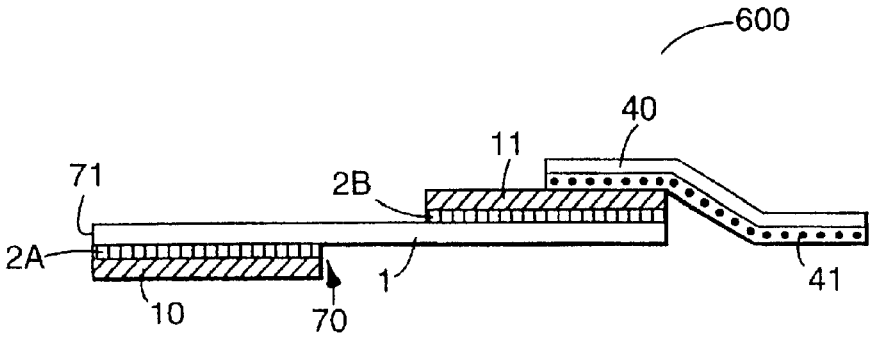
Figure 15:
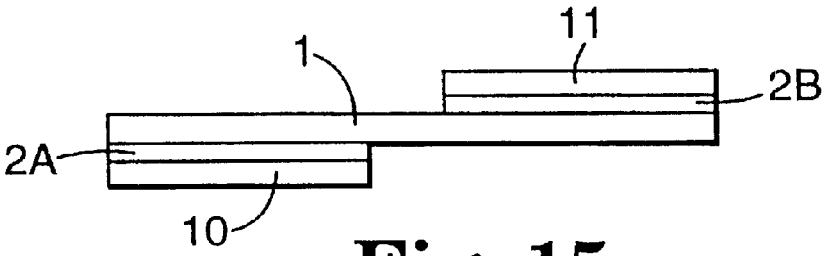
FIG. 15 shows a conventional staggered overlap splicing tape.

FIG. 10B shows a modification to the sixth embodiment of the present invention and is particularly suitable for forming a permanent splice. This modification includes a preattached stretch releasable 41 as was described with respect to the first embodiment. This additional tape is overlapped at least partially onto the release foil 11. The exposed stretch releasable adhesive layer 41 is used for carefully positioning the splicing tape with respect to the leading edge as has been described with respect to the eighth embodiment. After the PSA layer 2A has been firmly connected to the leading edge of the first roll, the backing 40 and the release foil 11 may be removed so as to expose the PSA layer 2B. The completion of the splice is then carried out in the way described with respect to the staggered overlap splicing tape shown in FIG. 15.

Figure 10C:
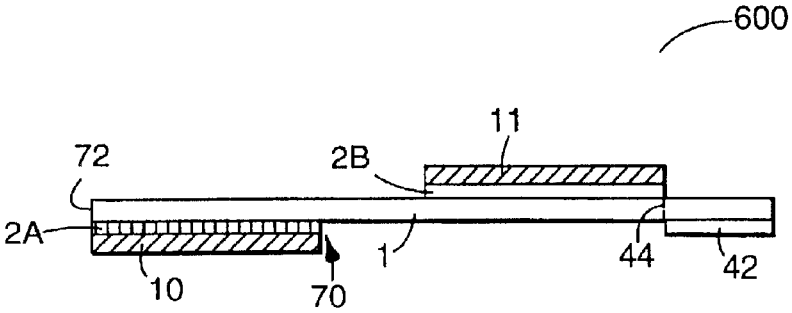

FIG. 10C shows a further modification of the sixth embodiment in which the backing 1 is extended and is provided with a weakly adhering, preferably repositionable coating layer 42 as was described with respect to the embodiment shown in FIG. 6C. The backing is also provided with a longitudinal weakness or perforation 44 between the end of the PSA layer 2B and the beginning of the repositionable adhesive layer 42 in a similar way to that shown in FIG. 6C. The repositionable layer 42 is used to position the tape with respect to the cut leading edge as has been described with respect to the eighth embodiment. After the correct position of the splicing tape has been obtained and the PSA layer 2A has been firmly attached to the cut leading edge the part of the backing tape including the repositionable adhesive layer 42 may be removed by tearing along the weakness or perforation 44. The splice is completed in the same way as has been described with respect to FIG. 10B.

Figure 10E:
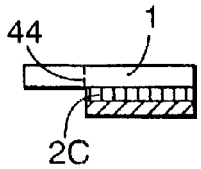

In a further modification of the sixth embodiment the repositionable adhesive layer 42 of FIG. 10C is replaced by a PSA layer 2C as shown in FIG. 10E. In this case if the tape is positioned incorrectly it is removed by tearing along the weakness or perforation 44 and is re-applied in the same way as described for the splicing tape shown in FIG. 15.

Alternatively, if the leading edge has already been fixed a knife may be introduced between the backing 1 and the sheet material of the roll below the PSA layer 2B and the splice can be broken out along the weakness or perforation 44. Otherwise when the tape is used as a permanent or flying splice the splice lifts from the underlying winding and tears along the weakness or perforation 44.

With respect to the embodiments described with respect to FIGS. 6A–G, 7A–F, 8E, and 10A and C, the weakly adhering, preferably repositionable adhesive layer 41, 42 or 49 may be provided by a double-sided adhesive tape with a weakly adhering, preferably repositionable adhesive layer on one side and a PSA layer on the other (not shown). The relevant splicing tapes are constructed by attaching the PSA side of this double-sided tape in the appropriate position on the backing 1 or release foil 10. Alternatively, the double-sided adhesive tape may be applied to the roll using the weakly adhering, preferably repositionable layer and the splicing tape attached to the exposed PSA layer.

Figure 11:
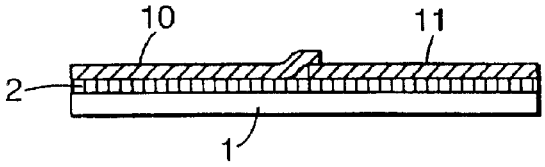
FIG. 11 shows a further embodiment of the present invention relating to butt splices.

FIG. 11 shows an embodiment of the present invention which can be applied to any butt splice. The foil 10 overlaps foil 11 slightly so that it is easy to grip foil 10. In a similar way foil 10 could be made to extend slightly beyond the backing 1 so that it is easier to grip.

Figure 12A:
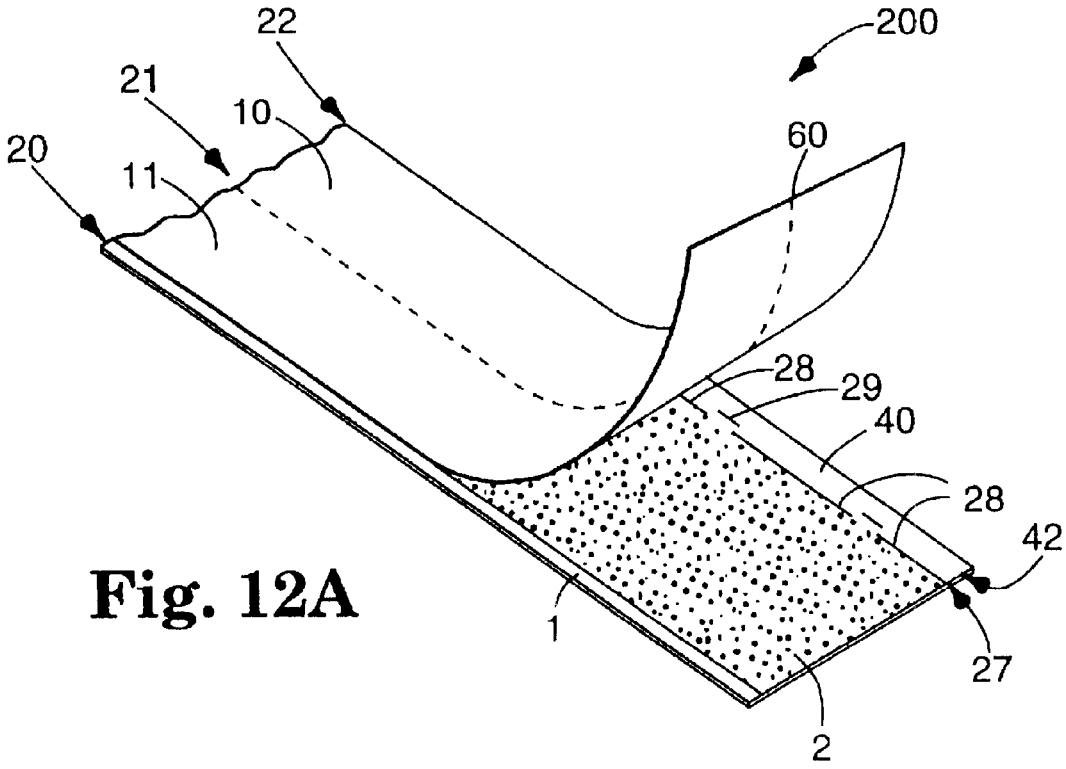
FIGS. 12A to 12D show further embodiments of the present invention.

FIGS. 6C, 6D, 6G, 7C, 7D, 8C, 8D, 8E, 9B, 10C, and 10E show embodiments of the invention including a longitudinal weakness or perforation 44, 52, 57. The weakness or perforation may be constructed as shown in FIGS. 12A to D. FIG. 12A shows a tape 200 of the type described with respect to FIG. 6C. As seen in FIG. 12A the first face of the backing 1 has the first and second adhesive layers 2 applied thereto. The adhesive layer 2 extends from a first longitudinal edge 20 of the backing 1 to a second position 27 via a first position 21 towards the second edge 22 of the backing 1. The second position 27 is spaced from the second edge by an end margin 40. The third adhesive layer 42 is applied to the second face of the backing (not shown). The third adhesive layer 42 starts adjacent to the vertical line through the perforations 28,29 and extends to the second edge 22 of the backing. The perforation may consist of a series of spaced longitudinal cuts 28 In addition stress cuts 29 may be located between, and parallel to the cuts 28 but offset therefrom. The stress cuts 29 relieve stress in the backing 1 between the cuts 28 and aid in defining separation along the longitudinal cuts 28. The longitudinal and stress cuts 28,29 should be located as close as possible to the adhesive layer 2 so that on separation there are no free areas of tape which can foul with other objects. Similarly the start of the third adhesive layer 42 should be as close as possible to the vertical line through the cuts 28,29 so that after separation no free tape areas are left on the underlying winding.

Figure 12B:
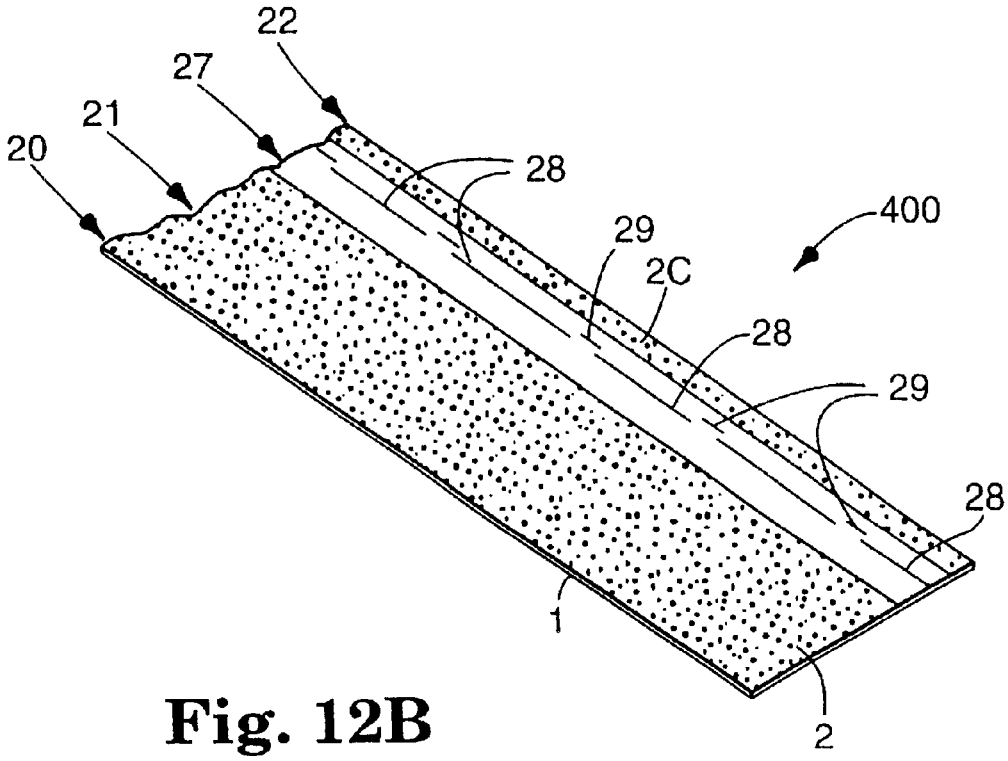

FIG. 12B shows a tape 400 in accordance with the invention of the type described with respect to FIG. 8D. Here the longitudinal slits and stress cuts 28,29 are located between the end 27 of the PSA layer 2 and the start of the PSA layer 2C.

Figure 12C:
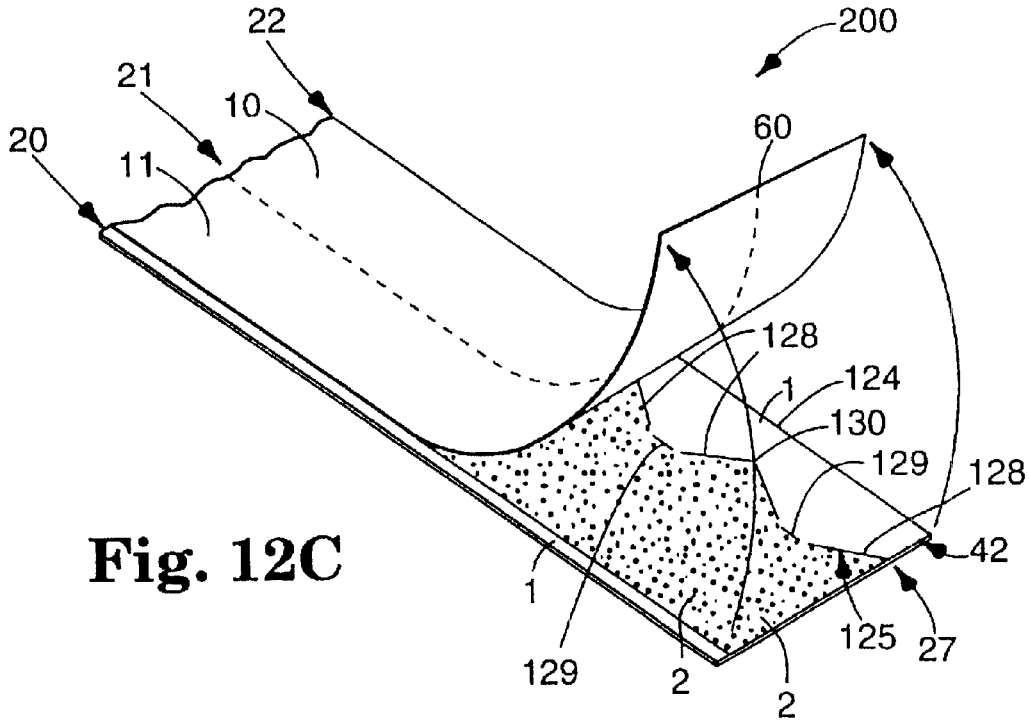
Figure 12D:
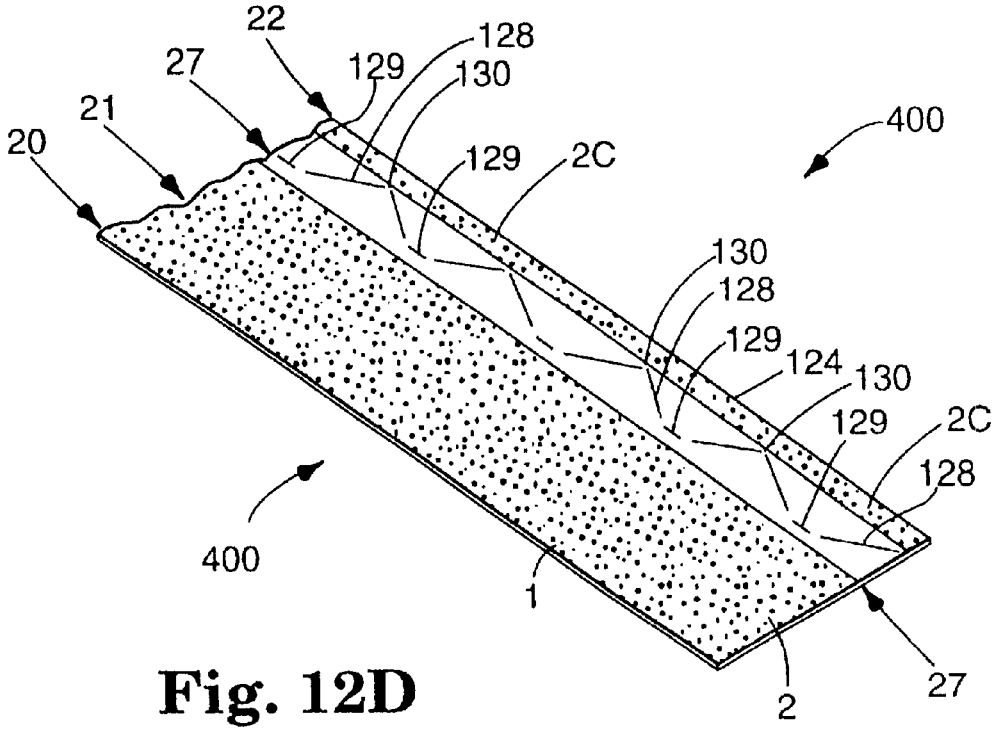
Figure 13:
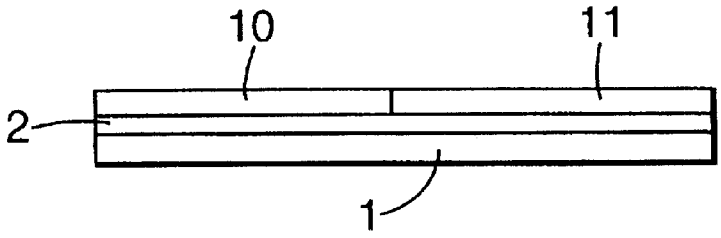
Fig. 13 (Prior Art)
FIG. 13 shows a conventional butt splicing tape.
Figure 14:
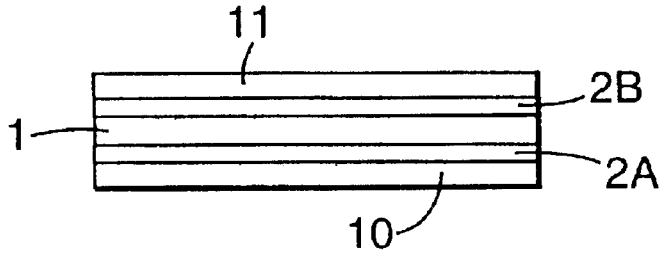
Fig. 14 (Prior Art)
FIG. 14 shows a conventional overlap splicing tape.

FIG. 12C shows a modification of the longitudinal weakness described with respect to FIG. 12 A. The weakened section is defined by a series of V-shaped cuts 128 in the backing 1. Between the V-shaped cuts 128 and adjacent to the PSA layer 2, stress cuts 129 may be located which extend substantially longitudinally with respect to the backing 1. Backing portions 130 may be located at each apex of the V-shaped cuts 128 to prevent premature separation. FIG. 12D shows a modification of the embodiment described with respect to FIG. 12B. As in the tape 400 in accordance with FIG. 12C the longitudinal weakness is provided by V-shaped and stress cuts 128,129 with backing portions 130 at the apex of each V-shaped cut 128.

In the embodiments shown in FIGS. 12A to D the cuts 28,29;128,129 may extend through the backing 1. Alternatively the cuts 28,29;128,129 may be defined by score lines or other means.

We claim:

1. A splicing tape for splicing the leading edge of a roll of sheet material to a further sheet material, each winding of said sheet material on said roll having an outer surface facing radially outwards away from said roll; comprising:

a splicing portion and a pre-formed attachment portion, said splicing portion including:

an elongate backing member having two faces and two longitudinal edges;

a first adhesive layer on *a first face of* said backing member for attachment of the leading edge of the roll substantially across the width of said roll to said backing member, said first adhesive layer extending across the width of said backing member from substantially the first longitudinal edge of said backing member to a first portion towards the centre thereof; and a second adhesive layer on [a] *said* first face of said backing member for attachment of said backing member to said further sheet material, said second adhesive layer beginning at or beyond, but not overlapping with said first position and extending across the width of said backing member to a second position towards the second longitudinal edge of said backing member;

wherein said pre-formed attachment portion is connected to and distributed along said splicing portion for releasable and self-supportive attachment of said splicing tape to the outer surface of the underlying winding of said roll substantially across the width of said roll, [characterized by] said pre-formed attachment portion including a third adhesive layer on *a second face of* said backing member for releasing at least said splicing portion from said underlying winding of said roll while leaving the outer surface of said underlying winding in a non-tacky condition.

2. Splicing tape according to claim 1, wherein said third adhesive layer includes a weakly adhering adhesive layer.

3. Splicing tape in accordance with claim 1, wherein said third adhesive layer includes a repositionable adhesive layer.

4. Splicing tape in accordance with claim 1, wherein said third adhesive layer includes a stretch release adhesive layer.

5. Splicing tape in accordance with claim 1, wherein said third adhesive layer includes an aggressive pressure sensitive adhesive layer.

6. Splicing tape in accordance with claim 1, wherein said third adhesive layer is applied on a section of said backing member adjacent to said second position and extends away therefrom towards the second longitudinal edge of said backing member.

7. Splicing tape in accordance with claim 6, wherein a mechanical weakness is provided longitudinally in said backing member between the second position and the start of the third adhesive layer.

8. Splicing tape in accordance with claim 1, wherein said third adhesive layer is applied to the second face of said backing member beginning substantially at said second longitudinal edge and extending across the width of said backing member towards the centre thereof.

9. Splicing tape in accordance with claim 1, wherein said splicing tape is repulpable.

10. A splice on the leading edge of a roll of sheet material for attachment to a further sheet material, each winding of said sheet material on said roll having an outer surface facing radially outwards away from said roll, comprising:

a splicing portion and a preformed attachment portion, said splicing portion comprising:

an elongate backing member having two faces and two longitudinal edges;

a first adhesive layer on *a first face of* said backing member attaching the leading edge of the roll of sheet material substantially across the width of said roll to said backing member, said first adhesive layer extending across the width of said backing member from substantially the first longitudinal edge of said backing member to a first position towards the centre thereof; and a second adhesive layer on [a] *said* first face of said backing member for attachment to said further sheet material, said second adhesive layer beginning at or beyond, but not overlapping with said first position and extending across the width of said backing member to a second position towards the second longitudinal edge of said backing member;

wherein said pre-formed attachment portion is connected to and distributed along said splicing portion and releasably and self-supportively attaching said splice to the outer surface of said underlying winding of said roll of sheet material substantially across the width of said roll, [characterized by] said pre-formed attachment portion including a third adhesive layer on *a second face of* said backing member for releasing at least said splicing portion from said underlying winding of said first roll while leaving the outer surface of said underlying winding in a non-tacky condition.

11. A splice according to claim 10, wherein said third adhesive layer includes a weakly adhering adhesive layer.

12. A splice in accordance with claim 10, wherein said third adhesive layer includes a repositionable adhesive layer.

13. A splice in accordance with claim 10, wherein said third adhesive layer includes a stretch release adhesive layer.

14. A splice in accordance with claim 10, wherein said third adhesive layer includes an aggressive pressure sensitive adhesive layer.

15. A splice in accordance with claim 10, wherein said third adhesive layer is applied on a section of said backing member adjacent to said second position and extends away therefrom towards the second longitudinal edge of said backing member.

16. A splice in accordance with claim 15, wherein a mechanical weakness is provided longitudinally in said backing member between the second position and the start of the third adhesive layer.

17. A splice in accordance with claim 10, wherein said third adhesive layer is applied to the second face of said backing member beginning substantially at said second longitudinal edge and extending across the width of said backing member towards the centre thereof.

18. A splice in accordance with claim 10, wherein said splice is repulpable.

19. A method of preparing a splice between the leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, said splicing portion comprising:

an elongate backing member having two faces and two longitudinal edges, a first adhesive layer on *a first face of* said backing member, said first adhesive layer being provided for attaching the leading edge of said roll of sheet material substantially across the width of said roll to said splicing tape and extending across the width of said backing member from substantially the first longitudinal edge of the backing member to a first position towards the centre thereof; and a second adhesive layer on [a] *said* first face of said backing member and being covered by at least one release foil, said second adhesive layer being provided for attachment to said further sheet material, said second adhesive layer beginning at or beyond, but not overlapping said first position and extending across the width of said backing member to a second position towards the second longitudinal edge of said backing member;

wherein said pre-formed attachment portion is connected to and distributed along said splicing portion for self-supportively and releasably attaching said splicing tape to the outer surface of the underlying winding of said roll of sheet material substantially across the width of said roll, said attachment portion including a third adhesive layer on *a second face of* said backing member for releasing at least said splicing portion from the underlying winding of said roll while leaving the outer surface of the underlying winding in a non-tacky condition, said method comprising the steps of:

attaching said splicing tape to the outer surface of said underlying winding using said third adhesive layer on said backing member substantially across the width of said roll;

attaching said leading edge to said first adhesive layer, and separating said attachment portion from said splicing portion attached to said leading edge while leaving the outer surface of said underlying winding in a non-tacky condition.

20. A method of making a splice between the leading edge of a roll of sheet material and a further sheet material using a splicing tape, each winding of said sheet material on said roll having an outer surface facing radially outwards away from said roll, said splicing tape comprising:

a splicing portion and a pre-formed attachment portion, said splicing portion comprising:

an elongate backing member having two faces and two longitudinal edges;

a first adhesive layer on *a first face of* said backing member, said first adhesive layer being provided for attachment of the leading edges of the roll of sheet material substantially across the width of said roll to said splicing tape and extending across the width of said backing member from substantially the first longitudinal edge of the backing member to a first position towards the centre thereof; and a second adhesive layer on [a] *said* first face of said backing member and being covered by at [lease] *least* one release foil, said second adhesive layer being provided for attachment of said backing member to the further sheet material, said second adhesive layer beginning at or beyond, but not overlapping with said first position and extending across the width of said backing member to a second position towards the second longitudinal edge of said backing member;

wherein said pre-formed attachment portion is connected to and distributed along said splicing portion for self-supportively and releasably attaching said splicing tape to the outer surface of the underlying winding of said roll of sheet material substantially across the width of said roll; said attachment portion including a third adhesive layer on *a second face of* said backing member for releasing at least said splicing portion from said underlying winding of said roll while leaving the outer surface of the underlying winding in a non-tacky condition, said method comprising the steps of:

attaching said spliced tape to the outer surface of said underlying winding using said third adhesive layer on said backing substantially across the width of said roll, attaching said leading edge to said first adhesive layer, exposing said second adhesive layer, attaching the further sheet material to the exposed second adhesive layer, and releasing said leading edge and said splicing portion attached thereto from said underlying winding while leaving the outer surface of said underlying winding non-tacky.

21. A splicing tape for splicing the leading edge of a roll of sheet material to a further sheet material, each winding of said sheet material on said roll having an outer surface facing radially outwards away from said roll, comprising:

a splicing portion and a pre-formed attachment portion, said splicing portion comprising:

an elongate backing member;

an adhesive layer on said backing member, a first part layer of said adhesive layer being provided for attachment of the leading edge of the roll of sheet material substantially across the width of said roll to said backing member and a second part layer of said adhesive layer being for attachment to said further sheet material;

wherein said pre-formed attachment portion is connected to and distributed along said splicing portion for releasable and self-supportive attachment of said splicing tape to the outer surface of the underlying winding of said roll of sheet material substantially across the width of said roll, characterized by said attachment portion being adapted for releasing at least said splicing portion from said underlying winding of said roll while leaving the outer surface of said underlying winding in a non-tacky condition and said attachment portion includes a stretch releasable adhesive layer.

* * * * *